(12) United States Patent
Iwatsuki et al.

(10) Patent No.: US 12,275,480 B2
(45) Date of Patent: Apr. 15, 2025

(54) CONTROLLER AND CONTROL METHOD

(71) Applicant: Robert Bosch GmbH, Stuttgart (DE)

(72) Inventors: Junya Iwatsuki, Kanagawa (JP); Koji Suzuki, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 18/043,366

(22) PCT Filed: Aug. 13, 2021

(86) PCT No.: PCT/IB2021/057478
§ 371 (c)(1),
(2) Date: Feb. 28, 2023

(87) PCT Pub. No.: WO2022/043817
PCT Pub. Date: Mar. 3, 2022

(65) Prior Publication Data
US 2023/0242198 A1    Aug. 3, 2023

(30) Foreign Application Priority Data

Aug. 31, 2020 (JP) .................................. 2020-145679

(51) Int. Cl.
*B62J 6/045* (2020.01)
*B60T 8/17* (2006.01)
(Continued)

(52) U.S. Cl.
CPC .............. *B62J 6/045* (2020.02); *B60T 8/1706* (2013.01); *B60T 8/17616* (2013.01);
(Continued)

(58) Field of Classification Search
CPC ...... B60T 8/1706; B60T 8/1701; B60T 8/176; B60T 8/1761; B60T 8/17616;
(Continued)

(56) References Cited

U.S. PATENT DOCUMENTS 5,522,652 A * 6/1996 Negrin ................ B60T 8/17616
303/177
6,711,488 B2 * 3/2004 Zierolf .................. B60T 8/1703
303/121
(Continued)

FOREIGN PATENT DOCUMENTS

EP    0024838 A1    3/1981
EP    2450247 A1    5/2012
(Continued)

OTHER PUBLICATIONS

English translation of JP2019156279 (Year: 2019).*
(Continued)

*Primary Examiner* — Russell Frejd
*Assistant Examiner* — Brandon Z Willis
(74) *Attorney, Agent, or Firm* — Michael Best & Friedrich LLP (57) ABSTRACT

The present invention obtains a controller and a control method capable of appropriately emitting an emergency braking signal in a straddle-type vehicle.
A controller (60) and the control method according to the present invention control operation of a straddle-type vehicle (100) in which anti-lock brake control for a front wheel (3) and anti-lock brake control for a rear wheel (4) are executed. An acquisition section of the controller (60) acquires an anti-lock brake actuation state showing whether the anti-lock brake control is actuated for any of the wheels (3, 4). A determination section of the controller (60) determines a threshold value on the basis of the anti-lock brake actuation state. An output section of the controller (60) outputs an emergency braking signal command in the case where deceleration of the straddle-type vehicle (100) is higher than the threshold value.

7 Claims, 5 Drawing Sheets

(51) Int. Cl.
*B60T 8/1761* (2006.01)
*B60T 8/32* (2006.01)
*B60T 17/22* (2006.01)
*B62J 6/26* (2020.01)

(52) U.S. Cl.
CPC ............ *B60T 8/3225* (2013.01); *B60T 17/22* (2013.01); *B62J 6/26* (2020.02); *B60T 2270/10* (2013.01)

(58) Field of Classification Search
CPC ........ B60T 8/1766; B60T 8/1769; B60T 8/26; B60T 8/261; B60T 8/28; B60T 8/32; B60T 8/321; B60T 8/3225; B60T 8/72; B60T 8/74; B60T 8/86; B60T 8/88; B60T 8/92; B60T 17/18; B60T 17/22; B60T 2270/10; B60W 10/18; B60W 2300/36; B62L 1/02; B62J 6/04; B62J 6/045; B62J 6/05; B62J 6/22; B62J 6/26; B62J 45/414
See application file for complete search history.

(56) References Cited

U.S. PATENT DOCUMENTS

2011/0098903 A1* 4/2011 Ogawa ................. B60T 8/1706
　　　　　　　　　　　　　　　　　　　701/71
2019/0135248 A1* 5/2019 Iizuka .................. B60T 8/1706

FOREIGN PATENT DOCUMENTS

| JP | H02241865 | * | 9/1990 |
| JP | H09328066 | * | 12/1997 |
| JP | 2018024324 A | | 2/2018 |
| JP | 2019156279 A | * | 9/2019 |

OTHER PUBLICATIONS

English translation of JPH02214865 (Year: 1990).*
English translation of JPH09328066 (Year: 1997).*
International Search Report and Written Opinion for Application No. PCT/IB2021/057478 dated Oct. 18, 2021 (9 pages).

* cited by examiner

CONTROLLER AND CONTROL METHOD

BACKGROUND OF THE INVENTION

The present disclosure relates to a controller and a control method capable of appropriately emitting an emergency braking signal in a straddle-type vehicle.

Conventionally, as a controller that controls operation of a straddle-type vehicle such as a motorcycle, a controller capable of executing anti-lock brake control is available. For example, as disclosed in JP-A-2018-024324, in the case where a wheel is locked or is possibly locked, the anti-lock brake control is executed, and control for reducing a braking force generated on the wheel is executed. In this way, locking of the wheel can be suppressed.

SUMMARY OF THE INVENTION

By the way, when the vehicle is rapidly decelerated, when the anti-lock brake control is actuated and the vehicle shows unstable behavior, or the like, there is a case where an emergency braking signal is emitted by blinking a lamp, such as a brake lamp or a hazard lamp, in order to draw attention of surrounding vehicles. Here, there is a case where the anti-lock brake control for a front wheel and the anti-lock brake control for a rear wheel are separately executed in the straddle-type vehicle. Also, in such a straddle-type vehicle, it is desired that the emergency braking signal is appropriately emitted.

The present invention has been made with the above-described problem as the background and therefore obtains a controller and a control method capable of appropriately emitting an emergency braking signal in a straddle-type vehicle.

Solution to Problem

A controller according to the present invention is a controller that controls operation of a straddle-type vehicle in which anti-lock brake control for a front wheel and anti-lock brake control for a rear wheel are executed. The controller includes: an acquisition section that acquires an anti-lock brake actuation state showing whether the anti-lock brake control is actuated for any of the wheels; a determination section that determines a threshold value on the basis of the anti-lock brake actuation state; and an output section that outputs an emergency braking signal command in the case where deceleration of the straddle-type vehicle is higher than the threshold value.

A control method according to the present invention is a method for controlling operation of a straddle-type vehicle in which anti-lock brake control for a front wheel and anti-lock brake control for a rear wheel are executed. The control method includes: acquiring an anti-lock brake actuation state by an acquisition section of a controller, the anti-lock brake actuation state showing whether the anti-lock brake control is actuated for any of the wheels; determining a threshold value on the basis of the anti-lock brake actuation state by a determination section of the controller; and outputting an emergency braking signal command by an output section of the controller in the case where deceleration of the straddle-type vehicle is higher than the threshold value.

Advantageous Effects of Invention

The controller and the control method according to the present invention control the operation of the straddle-type vehicle in which the anti-lock brake control for the front wheel and the anti-lock brake control for the rear wheel are executed. The acquisition section of the controller acquires the anti-lock brake actuation state showing whether the anti-lock brake control is executed for any of the wheels. The determination section of the controller determines the threshold value on the basis of the anti-lock brake actuation state. In the case where the deceleration of the straddle-type vehicle is higher than the threshold value, the output section of the controller outputs the emergency braking signal command. In this way, in each of the anti-lock brake actuation states, it is possible to change the threshold value according to the deceleration that is assumed to be generated on the straddle-type vehicle. Therefore, in the straddle-type vehicle, it is possible to appropriately emit an emergency braking signal.

DETAILED DESCRIPTION

A description will hereinafter be made on a controller according to the present invention with reference to the drawings.

Hereinafter, a description will be made on a controller used for a two-wheeled motorcycle (see a straddle-type vehicle 100 in FIG. 1). However, the controller according to the present invention may be used for a straddle-type vehicle other than the two-wheeled motorcycle (for example, a three-wheeled motorcycle, an all-terrain vehicle, or the like). The straddle-type vehicle means a vehicle that a rider straddles, and includes a scooter and the like.

In addition, the following description will be made on a case where each of a front-wheel brake mechanism and a rear-wheel brake mechanism is provided in one unit (see a front-wheel brake mechanism 12 and a rear-wheel brake mechanism 14 in FIG. 2). However, at least one of the front-wheel brake mechanism and the rear-wheel brake mechanism may be provided in multiple units.

A configuration, operation, and the like, which will be described below, merely constitute one example. The controller and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Straddle-Type Vehicle>

A description will be made on a configuration of the straddle-type vehicle 100 according to the embodiment of the present invention with reference to FIG. 1 to FIG. 3.

Figure 1:
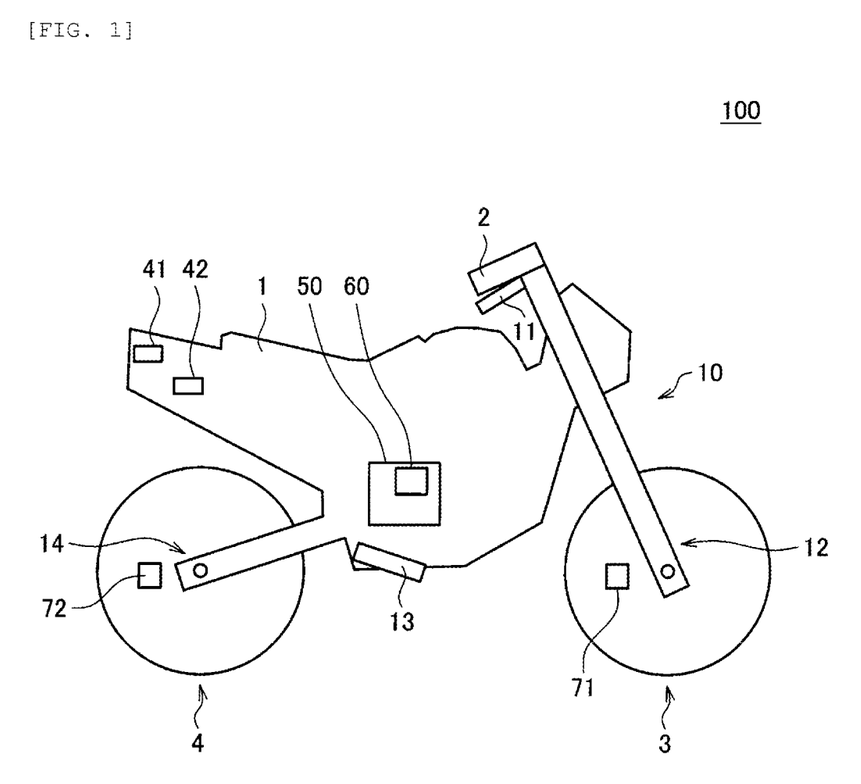
FIG. 1 is a schematic view illustrating an outline configuration of a straddle-type vehicle according to an embodiment of the present invention.

FIG. 1 is a schematic view illustrating an outline configuration of the straddle-type vehicle 100. FIG. 2 is a schematic view illustrating an outline configuration of a brake system 10. FIG. 3 is a block diagram illustrating an exemplary functional configuration of a controller 60.

The straddle-type vehicle 100 is a two-wheeled motorcycle that corresponds to an example of the straddle-type vehicle according to the present invention. As illustrated in FIG. 1, the straddle-type vehicle 100 includes: a trunk 1; a handlebar 2 that is held by the trunk 1 in a freely turnable manner; a front wheel 3 that is held by the trunk 1 in a freely turnable manner with the handlebar 2; a rear wheel 4 that is held by the trunk 1 in a freely rotatable manner; the brake system 10; a brake lamp 41; a hazard lamp 42; a hydraulic pressure control unit 50 provided to the brake system 10; the controller (ECU) 60 provided to the hydraulic pressure control unit 50; a front-wheel rotational frequency sensor 71; and a rear-wheel rotational frequency sensor 72. The straddle-type vehicle 100 includes a drive source such as an engine or a motor and travels by using power that is output from the drive source.

Figure 2:
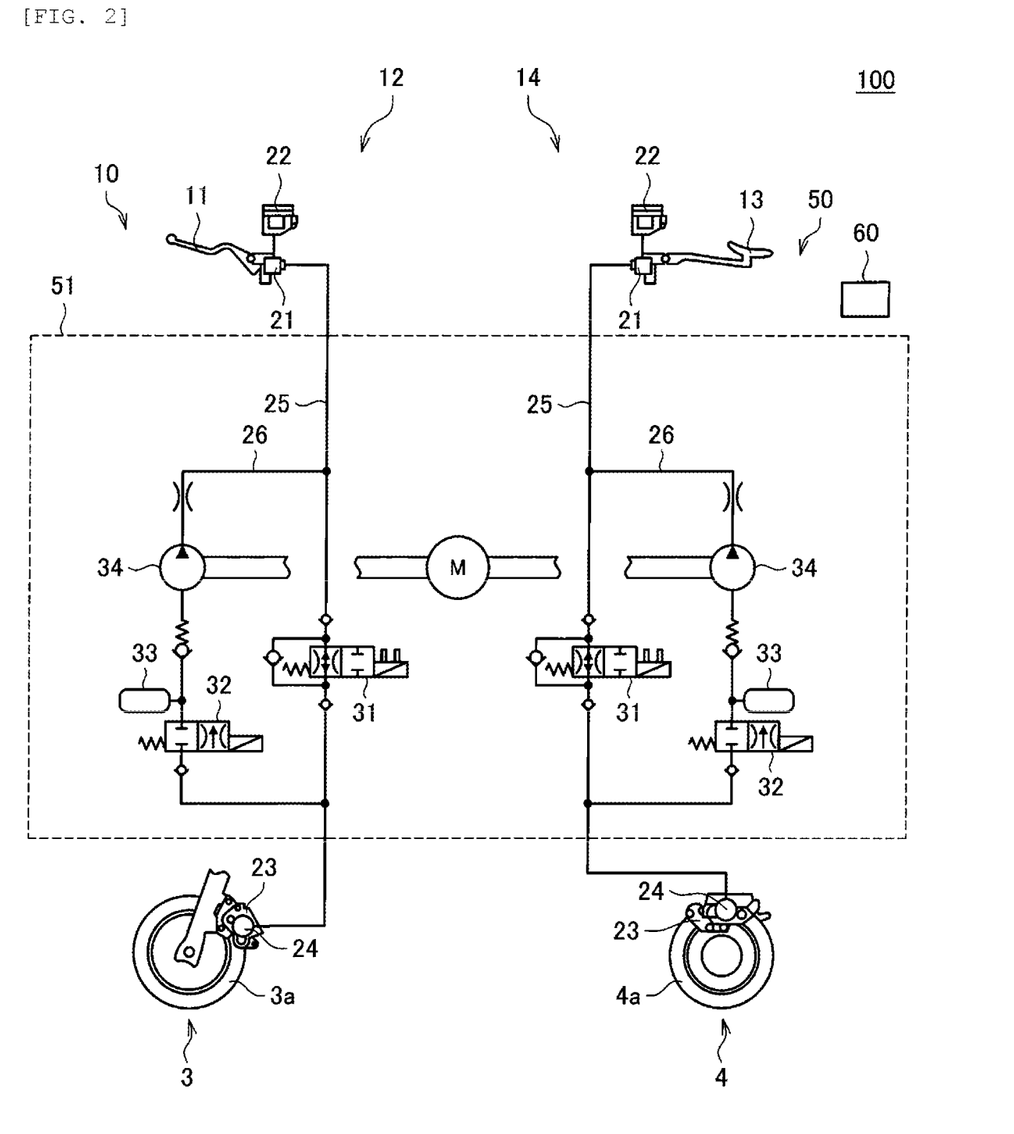
FIG. 2 is a schematic view illustrating an outline configuration of a brake system according to the embodiment of the present invention.

As illustrated in FIG. 1 and FIG. 2, the brake system 10 includes: a first brake operation section 11; the front-wheel brake mechanism 12 that brakes the front wheel 3 in an interlocking manner with at least the first brake operation section 11; a second brake operation section 13; and the rear-wheel brake mechanism 14 that brakes the rear wheel 4 in an interlocking manner with at least the second brake operation section 13. The brake system 10 also includes the hydraulic pressure control unit 50, and the front-wheel brake mechanism 12 and the rear-wheel brake mechanism 14 are partially included in the hydraulic pressure control unit 50. The hydraulic pressure control unit 50 is a unit that has a function of controlling a braking force to be generated on the front wheel 3 by the front-wheel brake mechanism 12 and a braking force to be generated on the rear wheel 4 by the rear-wheel brake mechanism 14.

The first brake operation section 11 is provided to the handlebar 2 and is operated by the rider's hand. The first brake operation section 11 is a brake lever, for example. The second brake operation section 13 is provided to a lower portion of the trunk 1 and is operated by the rider's foot. The second brake operation section 13 is a brake pedal, for example. However, like a brake operation section of a scooter or the like, each of the first brake operation section 11 and the second brake operation section 13 may be the brake lever that is operated by the rider's hand.

Each of the front-wheel brake mechanism 12 and the rear-wheel brake mechanism 14 includes: a master cylinder 21 that includes a piston (not illustrated); a reservoir 22 that is attached to the master cylinder 21; a brake caliper 23 that is held by the trunk 1 and has a brake pad (not illustrated); a wheel cylinder 24 that is provided to the brake caliper 23; a primary channel 25 through which a brake fluid in the master cylinder 21 flows into the wheel cylinder 24; and a secondary channel 26 through which the brake fluid in the wheel cylinder 24 is released.

An inlet valve (EV) 31 is provided to the primary channel 25. The secondary channel 26 bypasses a portion of the primary channel 25 between the wheel cylinder 24 side and the master cylinder 21 side of the inlet valve 31. The secondary channel 26 is sequentially provided with an outlet valve (AV) 32, an accumulator 33, and a pump 34 from an upstream side.

The inlet valve 31 is an electromagnetic valve that is opened in an unenergized state and closed in an energized state, for example. The outlet valve 32 is an electromagnetic valve that is closed in an unenergized state and opened in an energized state, for example.

The hydraulic pressure control unit 50 includes: components such as the inlet valve 31, the outlet valve 32, the accumulator 33, and the pump 34 used to control a brake hydraulic pressure; a base body 51 in which those components are provided and channels constituting the primary channel 25 and the secondary channel 26 are formed; and the controller 60.

The base body 51 may be formed of one member or may be formed of multiple members. In the case where the base body 51 is formed of the multiple members, the components may separately be provided to the different members.

The controller 60 controls operation of each of the components in the hydraulic pressure control unit 50. As a result, the braking force generated on the front wheel 3 by the front-wheel brake mechanism 12 and the braking force generated on the rear wheel 4 by the rear-wheel brake mechanism 14 are controlled.

During a normal time (that is, when the braking force corresponding to a brake operation by the rider is set to be generated on the wheel), the controller 60 opens the inlet valves 31 and closes the outlet valves 32. When the first brake operation section 11 is operated in such a state, in the front-wheel brake mechanism 12, the piston (not illustrated) in the master cylinder 21 is pressed to increase a hydraulic pressure of the brake fluid in the wheel cylinder 24, the brake pad (not illustrated) of the brake caliper 23 is then pressed against a rotor 3a of the front wheel 3, and the braking force is thereby generated on the front wheel 3. Meanwhile, when the second brake operation section 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4a of the rear wheel 4, and the braking force is thereby generated on the rear wheel 4.

The brake lamp 41 is provided to a rear portion of the trunk 1 of the straddle-type vehicle 100. The brake lamp 41 is turned on when the rider performs the brake operation.

The hazard lamp 42 is provided to each of right and left sides of the rear portion of the trunk 1 of the straddle-type vehicle 100. The hazard lamp 42 blinks according to an input operation by the rider and is used in time of emergency and the like. The hazard lamp 42 also has a function as a direction indicator.

The front-wheel rotational frequency sensor 71 is a rotational frequency sensor that detects a rotational frequency of the front wheel 3 (for example, a rotational frequency of the front wheel 3 per unit time [rpm], a travel distance per unit time [km/h], or the like), and outputs a detection result. The front-wheel rotational frequency sensor 71 may detect another physical quantity that can substantially be converted to the rotational frequency of the front wheel 3. The front-wheel rotational frequency sensor 71 is provided to the front wheel 3.

The rear-wheel rotational frequency sensor 72 is a rotational frequency sensor that detects a rotational frequency of the rear wheel 4 (for example, the rotational frequency of the rear wheel 4 per unit time [rpm], a travel distance per unit time [km/h], or the like), and outputs a detection result. The rear-wheel rotational frequency sensor 72 may detect another physical quantity that can substantially be converted to the rotational frequency of the rear wheel 4. The rear-wheel rotational frequency sensor 72 is provided to the rear wheel 4.

The controller 60 controls operation of the straddle-type vehicle 100.

For example, the controller 60 is partially or entirely constructed of a microcomputer, a microprocessor unit, or the like. Alternatively, the controller 60 may partially or entirely be constructed of a member in which firmware or the like can be updated, or may partially or entirely be a program module or the like that is executed by a command from a CPU or the like, for example. The controller 60 may be provided as one unit or may be divided into multiple units, for example.

Figure 3:
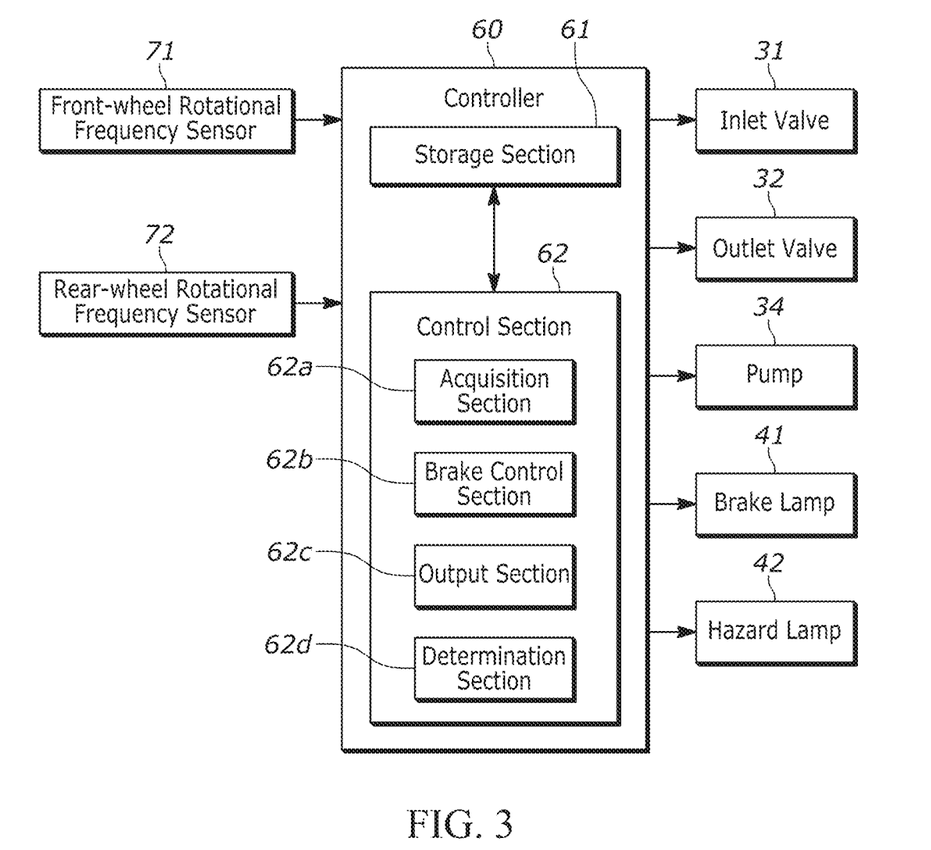
FIG. 3 is a block diagram illustrating an example of a functional configuration of a controller according to the embodiment of the present invention.

As illustrated in FIG. 3, the controller 60 includes a storage section 61 and a control section 62, for example.

The storage section 61 stores various types of information that are used for processing executed by the control section 62. For example, a threshold value of deceleration for an emergency braking signal used by an output section 62c, which will be described below, in the control section 62 is stored in the storage section 61 and is rewritten by the control section 62.

The control section 62 controls operation of each device in the straddle-type vehicle 100. In particular, the control section 62 can execute anti-lock brake control for the front wheel 3 and anti-lock brake control for the rear wheel 4. The control section 62 includes an acquisition section 62a, a brake control section 62b, the output section 62c, and a determination section 62d, for example.

The acquisition section 62a acquires information from each of the devices that are mounted to the straddle-type vehicle 100. For example, the acquisition section 62a acquires information from the front-wheel rotational frequency sensor 71 and the rear-wheel rotational frequency sensor 72.

Here, the acquisition section 62a acquires an anti-lock brake actuation state from the brake control section 62b. The anti-lock brake actuation state is a state showing whether the anti-lock brake control is actuated for any of the wheels. As will be described below, the brake control section 62b executes the anti-lock brake control for each of the wheels.

The brake control section 62b controls the operation of each of the components in the hydraulic pressure control unit 50 of the brake system 10, so as to control the braking force generated on each of the wheels of the straddle-type vehicle 100.

As described above, during the normal time, the brake control section 62b controls the operation of each of the components in the hydraulic pressure control unit 50 such that the braking force corresponding to the brake operation by the rider is generated on at least one of the wheels.

Here, in the case where a slip amount of the wheel exceeds a reference value, the brake control section 62b executes the anti-lock brake control. In the case where the slip amount of the wheel exceeds an upper limit value, the wheel is locked or is possibly locked. The anti-lock brake control is control for adjusting the braking force of the wheel to the braking force with which locking can be avoided.

For example, the brake control section 62b identifies a vehicle speed of the straddle-type vehicle 100 (that is, a speed of a vehicle body) on the basis of the rotational frequency of the front wheel 3 and the rotational frequency of the rear wheel 4, and calculates the slip amount of each of the wheels on the basis of a comparison result between the rotational frequency of respective one of the wheels and the vehicle speed. The slip amount is an index indicative of a degree of slippage of the wheel with respect to a road surface. For example, a difference between the vehicle speed and the rotational frequency is divided by the vehicle speed, and the thus-acquired slip rate is used as the slip amount. As the slip amount, a parameter other than the slip rate (for example, another physical quantity that can substantially be converted to the slip rate) may be used.

During the actuation of the anti-lock brake control, the brake control section 62b brings a state where the inlet valve 31 is closed and the outlet valve 32 is opened, and drives the pump 34 in such a state. In this way, the brake control section 62b reduces the hydraulic pressure of the brake fluid in the wheel cylinder 24 and thereby reduces the braking force generated on the wheel. Then, the brake control section 62b closes both of the inlet valve 31 and the outlet valve 32, thereby keeps the hydraulic pressure of the brake fluid in the wheel cylinder 24, and keeps the braking force generated on the wheel. Thereafter, the brake control section 62b opens the inlet valves 31 and closes the outlet valve 32, so as to increase the hydraulic pressure of the brake fluid in the wheel cylinder 24 and increase the braking force generated on the wheel.

During the actuation of the anti-lock brake control, the above control for reducing the braking force generated on the wheel (that is, braking force reduction control), the above control for keeping the braking force generated on the wheel (that is, braking force keeping control), and the above control for increasing the braking force generated on the wheel (that is, braking force increase control) are repeatedly executed in this order. The brake control section 62b can separately control the braking force generated on the front wheel 3 and the braking force generated on the rear wheel 4 by separately controlling the operation of the front-wheel brake mechanism 12 and the operation of the rear-wheel brake mechanism 14.

The output section 62c outputs an emergency braking signal command to the lamp such as the brake lamp 41 or the hazard lamp 42 and thereby causes the lamp to emit the emergency braking signal. The emergency braking signal is a signal that is emitted by causing the lamp, such as the brake lamp 41 or the hazard lamp 42, to blink in order to draw attention of surrounding vehicles in the case where the straddle-type vehicle 100 is rapidly decelerated, in the case where the anti-lock brake control is actuated and the straddle-type vehicle 100 shows unstable behavior, or the like.

Here, in the case where the deceleration of the straddle-type vehicle 100 is higher than the threshold value (that is, the threshold value of the deceleration for the emergency braking signal), the output section 62c outputs the emergency braking signal command. For example, the output section 62c identify transition of the vehicle speed of the straddle-type vehicle 100 on the basis of the rotational frequencies of the front wheel 3 and the rear wheel 4, and can thereby identifies the deceleration of the straddle-type vehicle 100 on the basis of a temporal change amount of the vehicle speed that is acquired from the transition of the vehicle speed.

The determination section 62d determines the threshold value of the deceleration for the emergency braking signal. In particular, the determination section 62d determines the threshold value of the deceleration for the emergency braking signal on the basis of the anti-lock brake actuation state. For example, in the case where the threshold value of the deceleration for the emergency braking signal that is stored in the storage section 61 differs from the determined value, the determination section 62d rewrites the threshold value to the determined value.

As described above, in the controller 60, the determination section 62d determines the threshold value of the deceleration for the emergency braking signal on the basis of the anti-lock brake actuation state. In this way, in the straddle-type vehicle 100, the emergency braking signal is appropriately emitted. A detailed description will be made below on processing related to the determination of the threshold value of the deceleration for the emergency braking signal, which is executed by the controller 60.

<Operation of Controller>

A description will be made on operation of the controller 60 according to the embodiment of the present invention with reference to FIG. 4 to FIG. 6.

Figure 4:
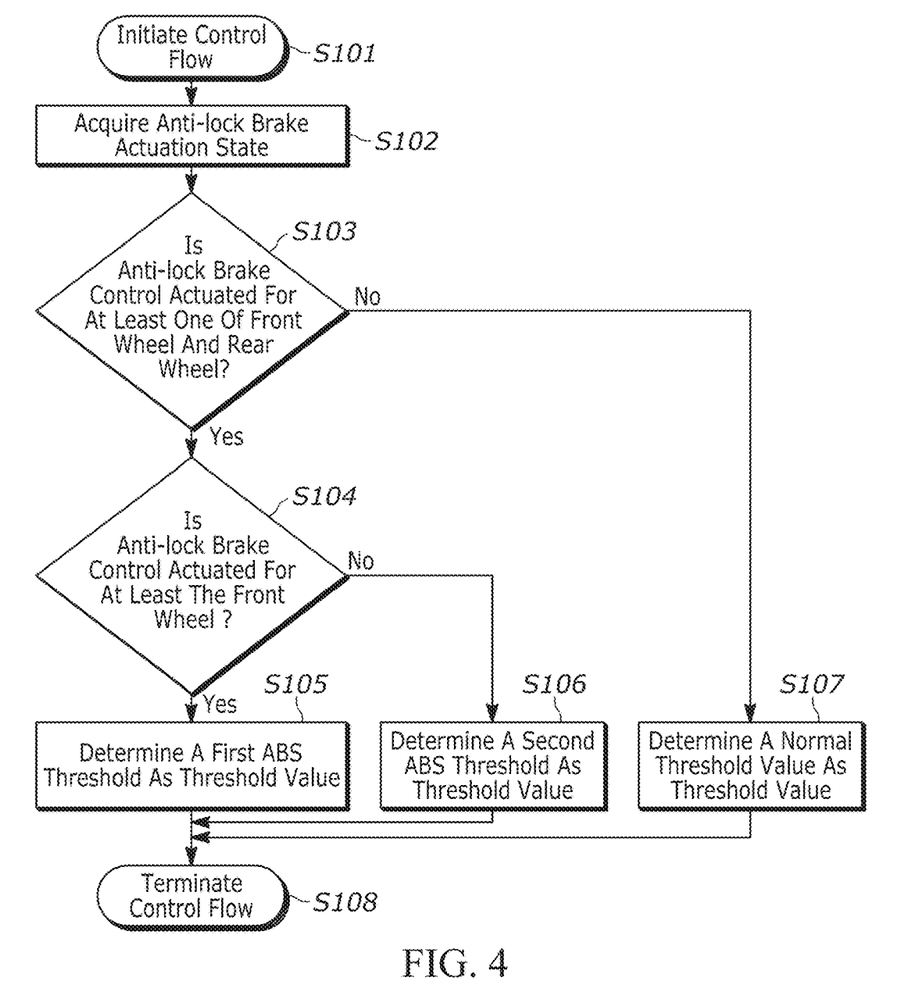
FIG. 4 is a flowchart of an exemplary processing flow related to determination of a threshold value of deceleration for an emergency braking signal that is executed by the controller according to the embodiment of the present invention.

FIG. 4 is a flowchart illustrating an exemplary processing flow related to the determination of the threshold value of the deceleration for the emergency braking signal, which is executed by the controller 60. For example, the control flow illustrated in FIG. 4 is repeatedly initiated at a time interval, which is set in advance, after being terminated. Step S101 and step S108 in FIG. 4 respectively correspond to initiation and termination of the control flow illustrated in FIG. 4.

When the control flow illustrated in FIG. 4 is initiated, in step S102, the acquisition section 62a acquires the anti-lock brake actuation state. Next, in step S103, the determination section 62d determines, on the basis of the anti-lock brake actuation state, whether the anti-lock brake control is actuated for at least one of the front wheel 3 and the rear wheel 4.

For example, in the case where the determination section 62d determines that, after the anti-lock brake control for the front wheel 3 is initiated, a second cycle of the braking force reduction control, the braking force keeping control, and the braking force increase control is executed, the determination section 62d determines that the anti-lock brake control for the front wheel 3 is actuated. Similarly, for example, in the case where the determination section 62d determines that, after the anti-lock brake control for the rear wheel 4 is initiated, the second cycle of the braking force reduction control, the braking force keeping control, and the braking force increase control is executed, the determination section 62d determines that the anti-lock brake control for the rear wheel 4 is actuated. The determination condition for each of the wheels on whether the anti-lock brake control is actuated is not limited to the above example, and only needs to be a condition with which it is possible to determine that the anti-lock brake control is executed continuously to some extent.

If it is determined that the anti-lock brake control is actuated for at least one of the front wheel 3 and the rear wheel 4 (step S103/YES), the processing proceeds to step S104. In this case, as will be described below, the determination section 62d determines an ABS threshold value (more specifically, a first ABS threshold value in step S105 or a second ABS threshold value in step S106) as the threshold value of the deceleration for the emergency braking signal.

On the other hand, if it is determined that the anti-lock brake control is actuated for neither the front wheel 3 nor the rear wheel 4 (step S103/NO), the processing proceeds to step S107. Then, the determination section 62d determines a normal threshold value as the threshold value of the deceleration for the emergency braking signal, and the control flow illustrated in FIG. 4 is terminated.

The normal threshold value is a value (for example, approximately 6 $[m/s^2]$) that is higher than the ABS threshold value. Thus, during the actuation of the anti-lock brake control, the threshold value of the deceleration for the emergency braking signal is lower than that at the time when the anti-lock brake control is not actuated. In this way, it is possible to facilitate emission of the emergency braking signal during the actuation of the anti-lock brake control. Note that setting of the threshold value during the actuation of the anti-lock brake control to be smaller than that at the time when the anti-lock brake control is not actuated conforms to UN Regulation No. 78 among automobile regulations.

If it is determined YES in step S103, in step S104, the determination section 62d determines whether the anti-lock brake control is actuated for at least the front wheel 3.

In the case where only the anti-lock brake control for the front wheel 3 is actuated, it is determined YES in step S104. Furthermore, also in the case where both of the anti-lock brake control for the front wheel 3 and the anti-lock brake control for the rear wheel 4 are actuated, it is determined YES in step S104. If it is determined YES in step S104, the processing proceeds to step S105. Then, the determination section 62d determines the first ABS threshold value as the threshold value of the deceleration for the emergency braking signal, and the control flow illustrated in FIG. 4 is terminated.

On the other hand, in the case where only the anti-lock brake control for the rear wheel 4 is actuated, it is determined NO in step S104. If it is determined NO in step S104, the processing proceeds to step S106. Then, the determination section 62d determines the second ABS threshold value as the threshold value of the deceleration for the emergency braking signal, and the control flow illustrated in FIG. 4 is terminated.

The first ABS threshold value is higher than the second ABS threshold value. For example, the first ABS threshold value is approximately 5 $[m/s^2]$, and the second ABS threshold value is approximately 3 $[m/s^2]$. The deceleration that is assumed to be generated on the straddle-type vehicle 100 possibly differs by the anti-lock brake actuation state. For example, in the case where only the anti-lock brake control for the front wheel 3 is actuated, the deceleration that is assumed to be generated on the straddle-type vehicle 100 is higher than that in the case where only the anti-lock brake control for the rear wheel 4 is actuated. The first ABS threshold value is set to such a value that, when the deceleration, which is assumed to be generated in the case where only the anti-lock brake control for the front wheel 3 is actuated, is generated on the straddle-type vehicle 100, the emergency braking signal is appropriately emitted. The second ABS threshold value is set to such a value that, when the deceleration, which is assumed to be generated in the case where only the anti-lock brake control for the rear wheel 4 is actuated, is generated on the straddle-type vehicle 100, the emergency braking signal is appropriately emitted.

Here, in the control flow illustrated in FIG. 4, in the case where both of the anti-lock brake control for the front wheel 3 and the anti-lock brake control for the rear wheel 4 are actuated, the determination section 62d determines, as the threshold value of the deceleration for the emergency braking signal, a value that is equal to the value in the case where only the anti-lock brake control for the front wheel 3 is actuated (that is, the first ABS threshold value). However, in the case where both of the anti-lock brake control for the front wheel 3 and the anti-lock brake control for the rear wheel 4 are actuated, the determination section 62d may determine, as the threshold value of the deceleration for the emergency braking signal, a value that is equal to the value in the case where only the anti-lock brake control for the rear wheel 4 is actuated (that is, the second ABS threshold value).

As described above, the determination section 62d determines the threshold value of the deceleration for the emergency braking signal on the basis of the anti-lock brake actuation state. Here, if the threshold value of the deceleration for the emergency braking signal is uniformly determined regardless of the anti-lock brake actuation state, the threshold value is possibly much higher or much lower than the deceleration of the straddle-type vehicle 100, which is assumed in the particular anti-lock brake actuation state.

As described above, the deceleration that is assumed to be generated on the straddle-type vehicle 100 possibly differs by the anti-lock brake actuation state. Thus, if the first ABS threshold value is used as the threshold value of the deceleration for the emergency braking signal regardless of the anti-lock brake actuation state, the threshold value is much higher than the deceleration of the straddle-type vehicle 100, which is assumed in the case where only the anti-lock brake control for the rear wheel 4 is actuated. As a result, such a situation possibly arises that the emergency braking signal is not emitted even when the anti-lock brake control for the rear wheel 4 is actually actuated.

Meanwhile, if the second ABS threshold value is used as the threshold value of the deceleration for the emergency braking signal regardless of the anti-lock brake actuation state, the threshold value is much lower than the deceleration of the straddle-type vehicle 100, which is assumed in the case where only the anti-lock brake control for the front wheel 3 is actuated. As a result, such a situation possibly arises that the emergency braking signal is erroneously emitted when the anti-lock brake control for the front wheel 3 is erroneously actuated during travel on a rough road with a sequence of bumps, or the like.

In this embodiment, as described above, the determination section 62d determines the threshold value of the deceleration for the emergency braking signal on the basis of the anti-lock brake actuation state. In this way, in each of the anti-lock brake actuation states, it is possible to change the threshold value according to the deceleration that is assumed to be generated on the straddle-type vehicle 100. Thus, it is possible to suppress the threshold value from becoming much higher or much lower than the deceleration of the straddle-type vehicle 100 that is assumed in the particular anti-lock brake actuation state. Therefore, it is possible to appropriately emit the emergency braking signal in a manner to correspond to the anti-lock brake actuation state.

In particular, in the case where only the anti-lock brake control for the front wheel 3 is actuated, the determination section 62d determines, as the threshold value of the deceleration for the emergency braking signal, a relatively higher value than the value in the case where only the anti-lock brake control for the rear wheel 4 is actuated. In this way, it is possible to appropriately suppress the threshold value from becoming much higher or much lower than the deceleration of the straddle-type vehicle 100 that is assumed in the particular anti-lock brake actuation state.

Here, when changing the threshold value of the deceleration for the emergency braking signal, the determination section 62d preferably changes the threshold value with time. In this way, it is possible to suppress rapid switching between a situation where the emergency braking signal is emitted and a situation where the emergency braking signal is not emitted.

Figure 5:
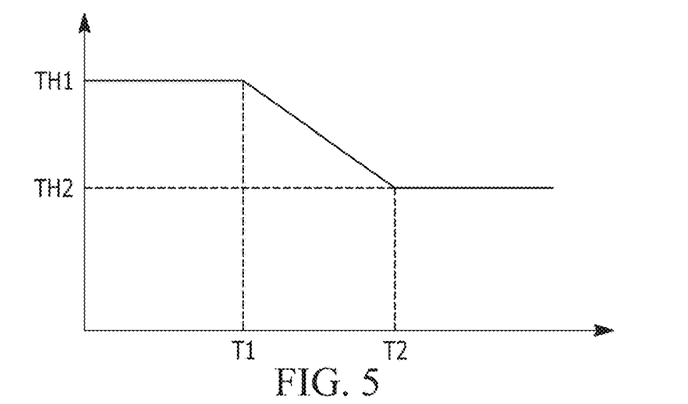
FIG. 5 is a schematic graph illustrating transition of the threshold value of the deceleration for the emergency braking signal in the case where the threshold value is changed from a first ABS threshold value to a second ABS threshold value.

FIG. 5 is a schematic graph illustrating transition of the threshold value of the deceleration for the emergency braking signal in the case where the threshold value is changed from a first ABS threshold value TH1 to a second ABS threshold value TH2. In FIG. 5, a horizontal axis represents time, and a vertical axis represents the threshold value of the deceleration for the emergency braking signal.

In an example illustrated in FIG. 5, prior to a time point T1, the threshold value of the deceleration for the emergency braking signal is the first ABS threshold value TH1. Then, at the time point T1, for example, the anti-lock brake actuation state is switched from a state where only the anti-lock brake control for the front wheel 3 is actuated to a state where only the anti-lock brake control for the rear wheel 4 is actuated. In conjunction therewith, at the time point T1, the determination section 62d starts reducing the threshold value of the deceleration for the emergency braking signal from the first ABS threshold value TH1 to the second ABS threshold value TH2.

Here, from the time point T1 to a time point T2, the determination section 62d reduces the threshold value of the deceleration for the emergency braking signal with time. Then, at the time point T2, the threshold value of the deceleration for the emergency braking signal becomes the second ABS threshold value TH2. Note that, in the example illustrated in FIG. 5, the threshold value of the deceleration for the emergency braking signal is reduced at a constant time rate of change from the time point T1 to the time point T2. However, the time rate of change of the threshold value at the time of reducing the threshold value may not be constant. For example, the time rate of change may be determined by using a primary delay function. As described above, when changing the threshold value of the deceleration for the emergency braking signal from the high value to the low value, the determination section 62d may reduce the threshold value with time.

Figure 6:
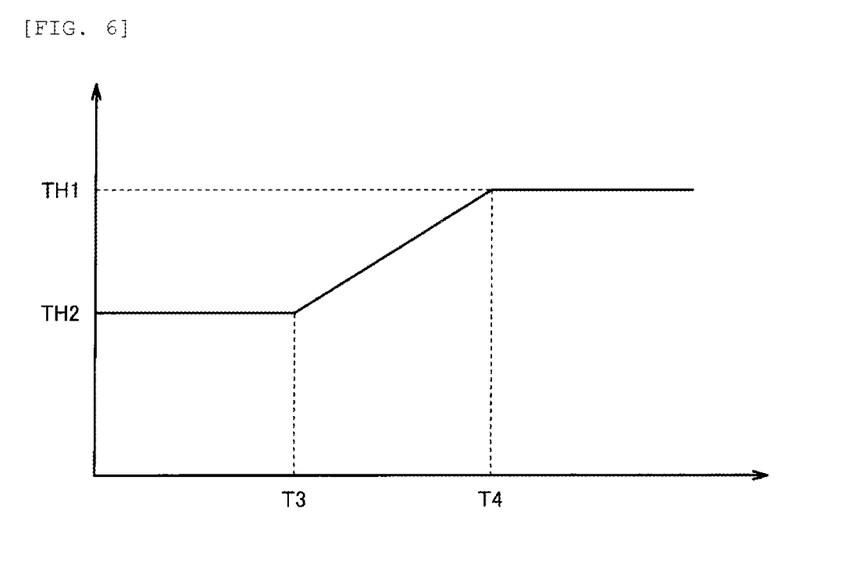
FIG. 6 is a schematic graph illustrating the transition of the threshold value of the deceleration for the emergency braking signal in the case where the threshold value is changed from the second ABS threshold value to the first ABS threshold value.

FIG. 6 is a schematic graph illustrating the transition of the threshold value of the deceleration for the emergency braking signal in the case where the threshold value is changed from the second ABS threshold value TH2 to the first ABS threshold value TH1. In FIG. 6, similar to FIG. 5, a horizontal axis represents the time, and a vertical axis represents the threshold value of the deceleration for the emergency braking signal.

In an example illustrated in FIG. 6, prior to a time point T3, the threshold value of the deceleration for the emergency braking signal is the second ABS threshold value TH2. Then, at the time point T3, for example, the anti-lock brake actuation state is switched from the state where only the anti-lock brake control for the rear wheel 4 is actuated to the state where only the anti-lock brake control for the front wheel 3 is actuated. In conjunction therewith, at the time point T3, the determination section 62d starts increasing the threshold value of the deceleration for the emergency braking signal from the second ABS threshold value TH2 to the first ABS threshold value TH1.

Here, from the time point T3 to a time point T4, the determination section 62d increases the threshold value of the deceleration for the emergency braking signal with time. Then, at the time point T4, the threshold value of the deceleration for the emergency braking signal becomes the first ABS threshold value TH1. Note that, in the example illustrated in FIG. 6, the threshold value of the deceleration for the emergency braking signal is increased at a constant time rate of change from the time point T3 to the time point T4. However, the time rate of change of the threshold value at the time of increasing the threshold value may not be constant. For example, the time rate of change may be determined by using the primary delay function. As described above, when changing the threshold value of the deceleration for the emergency braking signal from the low value to the high value, the determination section 62d may increase the threshold value with time.

<Effects of Controller>

A description will be made on effects of the controller 60 according to the embodiment of the present invention.

In the controller 60, the acquisition section 62a acquires the anti-lock brake actuation state showing whether the anti-lock brake control is actuated for any of the wheels. The determination section 62d determines the threshold value (that is, the threshold value of the deceleration for the emergency braking signal) on the basis of the anti-lock brake actuation state. In the case where the deceleration of the straddle-type vehicle 100 is higher than the threshold value, the output section 62c outputs the emergency braking signal command. In this way, in each of the anti-lock brake actuation states, it is possible to change the threshold value according to the deceleration that is assumed to be generated on the straddle-type vehicle 100. Therefore, in the straddle-type vehicle 100, it is possible to appropriately emit the emergency braking signal.

Preferably, in the controller 60, in the case where only the anti-lock brake control for the front wheel 3 is actuated, the determination section 62d determines, as the threshold value, the relatively higher value than the value in the case where only the anti-lock brake control for the rear wheel 4 is actuated. In this way, it is possible to appropriately suppress the threshold value from becoming much higher or much lower than the deceleration of the straddle-type vehicle 100 that is assumed in the particular anti-lock brake actuation state. Therefore, in the straddle-type vehicle 100, it is possible to further appropriately emit the emergency braking signal.

Preferably, in the controller 60, in the case where both of the anti-lock brake control for the front wheel 3 and the anti-lock brake control for the rear wheel 4 are actuated, the determination section 62d determines, as the threshold value, the value that is equal to the value in the case where only the anti-lock brake control for the front wheel 3 is actuated (that is, the first ABS threshold value). In this way, for example, compared to the case where the second ABS threshold value is determined as the threshold value, it is possible to hinder the emission of the emergency braking signal. Therefore, it is possible to suppress erroneous emission of the emergency braking signal at the time when the anti-lock brake control is erroneously actuated during the travel on the rough road with the sequence of bumps, or the like.

Preferably, in the controller 60, in the case where both of the anti-lock brake control for the front wheel 3 and the anti-lock brake control for the rear wheel 4 are actuated, the determination section 62d determines, as the threshold value, the value that is equal to the value in the case where only the anti-lock brake control for the rear wheel 4 is actuated (that is, the second ABS threshold value). In this way, for example, compared to the case where the first ABS threshold value is determined as the threshold value, it is possible to facilitate the emission of the emergency braking signal. Therefore, it is possible to suppress occurrence of such a situation where the emergency braking signal is not emitted even when the anti-lock brake control is actually actuated.

Preferably, in the controller 60, when changing the threshold value, the determination section 62d changes the threshold value with time. In this way, it is possible to suppress rapid switching between the situation where the emergency braking signal is emitted and the situation where the emergency braking signal is not emitted. Therefore, it is possible to suppress drivers of the vehicles around the straddle-type vehicle 100 from being confused.

Preferably, in the controller 60, when changing the threshold value from the high value to the low value, the determination section 62d reduces the threshold value with time. In this way, it is possible to suppress rapid switching between the situation where the emergency braking signal is not emitted and the situation where the emergency braking signal is emitted. Therefore, it is possible to appropriately suppress the drivers of the vehicles around the straddle-type vehicle 100 from being confused.

Preferably, in the controller 60, when changing the threshold value from the low value to the high value, the determination section 62d increases the threshold value with time. In this way, it is possible to suppress rapid switching from the situation where the emergency braking signal is emitted to the situation where the emergency braking signal is not emitted. Therefore, it is possible to appropriately suppress the drivers of the vehicles around the straddle-type vehicle 100 from being confused.

The present invention is not limited to the embodiment that has been described. For example, only a part of the embodiment may be implemented.

REFERENCE SIGNS LIST

1: Trunk
2: Handlebar
3: Front wheel
3a: Rotor
4: Rear wheel
4a: Rotor
10: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
26: Secondary channel
31: Inlet valve
32: Outlet valve
33: Accumulator
34: Pump
41: Brake lamp
42: Hazard lamp
50: Hydraulic pressure control unit
51: Base body
60: Controller
61: Storage section
62: Control section 62a: Acquisition section
62b: Brake control section
62c: Output section
62d: Determination section
71: Front-wheel rotational frequency sensor
72: Rear-wheel rotational frequency sensor
100: Straddle-type vehicle

The invention claimed is:

1. A controller (60) for controlling operation of a straddle-type vehicle (100) in which anti-lock brake control for a front wheel (3) and anti-lock brake control for a rear wheel (4) are executed, the controller comprising:
    an acquisition section (62a) that acquires an anti-lock brake actuation state showing whether the anti-lock brake control is actuated for any of the wheels (3, 4);
    a determination section (62d) that determines a threshold value based on the anti-lock brake actuation state; and
    an output section (62c) that outputs an emergency braking signal command in the case where deceleration of the straddle-type vehicle (100) is greater than the threshold value,
        wherein in the case where only the anti-lock brake control for the front wheel (3) is actuated, the determination section (62d) determines, as the threshold value, a greater value than a value in the case where only the anti-lock brake control for the rear wheel (4) is actuated.

2. The controller according to claim 1, wherein in the case where both of the anti-lock brake control for the front wheel (3) and the anti-lock brake control for the rear wheel (4) are actuated, the determination section (62d) determines, as the threshold value, a value that is equal to a value in the case where only the anti-lock brake control for the front wheel (3) is actuated.

3. The controller according to claim 1, wherein in the case where both of the anti-lock brake control for the front wheel (3) and the anti-lock brake control for the rear wheel (4) are actuated, the determination section (62d) determines, as the threshold value, a value that is equal to the value in the case where only the anti-lock brake control for the rear wheel (4) is actuated.

4. The controller according to claim 1, wherein when changing the threshold value, the determination section (62d) changes the threshold value with time.

5. The controller according to claim 4, wherein when changing the threshold value from a high value to a low value, the determination section (62d) reduces the threshold value with time.

6. The controller according to claim 4, wherein when changing the threshold value from the low value to the high value, the determination section (62d) increases the threshold value with time.

7. A method for controlling operation of a straddle-type vehicle (100) in which anti-lock brake control for a front wheel (3) and anti-lock brake control for a rear wheel (4) are executed, the control method comprising:
    acquiring an anti-lock brake actuation state by an acquisition section (62a) of a controller (60), the anti-lock brake actuation state showing whether the anti-lock brake control is actuated for any of the wheels (3, 4);
    determining a threshold value based on the basis of the anti-lock brake actuation state by a determination section (62d) of the controller (60); and
    outputting an emergency braking signal command by an output section (62c) of the controller (60) in the case where deceleration of the straddle-type vehicle (100) is greater higher than the threshold value,
        wherein in the case where only the anti-lock brake control for the front wheel (3) is actuated, determining, as the threshold value, a greater value than a value in the case where only the anti-lock brake control for the rear wheel (4) is actuated by the determination section (62d).

* * * * *